US012744563B2

(12) United States Patent
Dikme et al.

(10) Patent No.: US 12,744,563 B2
(45) Date of Patent: Sep. 22, 2026

(54) QUANTUM APPROACH TO GENERATE SOFT BIT INFORMATION IN MULTI-ANTENNA COMMUNICATION SYSTEMS

(71) Applicant: Telefonaktiebolaget LM Ericsson (publ), Stockholm (SE)

(72) Inventors: Altay Dikme, Stockholm (SE); Sairamesh Nammi, Austin, TX (US); Ahsan Javed Awan, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 175 days.

(21) Appl. No.: 18/702,006

(22) PCT Filed: Jan. 25, 2022

(86) PCT No.: PCT/SE2022/050069
§ 371 (c)(1),
(2) Date: Apr. 17, 2024

(87) PCT Pub. No.: WO2023/146438
PCT Pub. Date: Aug. 3, 2023

(65) Prior Publication Data
US 2024/0413860 A1 Dec. 12, 2024

(51) Int. Cl.
*H04W 28/02* (2009.01)
*G06N 10/60* (2022.01)
*H04B 7/0413* (2017.01)

(52) U.S. Cl.
CPC .......... *H04B 7/0413* (2013.01); *G06N 10/60* (2022.01); *H04W 28/0268* (2013.01)

(58) Field of Classification Search
CPC .......... H04W 28/0268; H04W 72/231; H04W 72/1268; H04W 28/026; H04W 72/126;
(Continued)

(56) References Cited

U.S. PATENT DOCUMENTS 10,592,816 B1 3/2020 Hsu et al.
2007/0076669 A1* 4/2007 Boroujeny .......... H04L 25/067 370/335
2011/0066902 A1* 3/2011 Sharon .......... G11C 29/52 714/E11.034

(Continued)

FOREIGN PATENT DOCUMENTS

WO 2020227721 A1 11/2020

OTHER PUBLICATIONS

Cui, Jingjing, et al., "Quantum Approximate Optimization Algorithm Based Maximum Likelihood Detection", https://doi.org/10.48550/arXiv.2107.05020, Jul. 11, 2021, pp. 1-30.

(Continued)

*Primary Examiner* — Wei Zhao
(74) *Attorney, Agent, or Firm* — Murphy, Bilak & Homiller, PLLC

(57) ABSTRACT

Quantum computing methods are used to generate the soft bit information for decoding by solving a single hard MIMO maximum likelihood detection problem using the quantum computer. Probabilities $P(b_i=1|y)$ and $P(b_i=0|y)$ are determined from the state distribution that is obtained when executing a quantum circuit with a large number of shots.

17 Claims, 20 Drawing Sheets

(58) Field of Classification Search
CPC ..... H04W 72/23; G06N 10/40; H04B 7/0413; H04B 7/041
See application file for complete search history.

(56) References Cited

U.S. PATENT DOCUMENTS

2013/0294318 A1* 11/2013 Amerga .................. H04W 4/06 370/312
2019/0081824 A1 3/2019 Arvinte et al.

OTHER PUBLICATIONS

Hochwald, Bertrand M., et al., "Achieving Near-Capacity on a Multiple-Antenna Channel", IEEE Transactions on Communications, vol. 51, No. 3, Mar. 2003., Mar. 2003, pp. 1-11.
Kim, Minsung, et al., "Leveraging !antum Annealing for Large MIMO Processing in Centralized Radio Access Networks", SIGCOMM '19: Proceedings of the ACM Special Interest Group on Data Communication, 2019, pp. 1-15.
Kim, Minsung, et al., "Physics-Inspired Heuristics for Soft MIMO Detection in 5G New Radio and Beyond", ACM MobiCom '21, New Orleans, LA, USA, Oct. 25-29, 2023, pp. 1-14.
Marosits, Ádám, et al., "Exploring Embeddings for MIMO Channel Decoding on Quantum Annealers", Infocommunications Journal; vol. XIII, No. 1, Mar. 2021, pp. 11-17.
Tabi, Zsolt I., et al., "Evaluation of Quantum Annealer Performance via the Massive MIMO Problem", IEEE Access, vol. 9, Sep. 22, 2021, pp. 131658-131671.
Vyskocil, T., et al., "Constraint Embedding for Solving Optimization Problems on Quantum Annealers", 2019 IEEE International Parallel and Distributed Processing Symposium Workshops (IPDPSW), 2019, pp. 635-644.

* cited by examiner

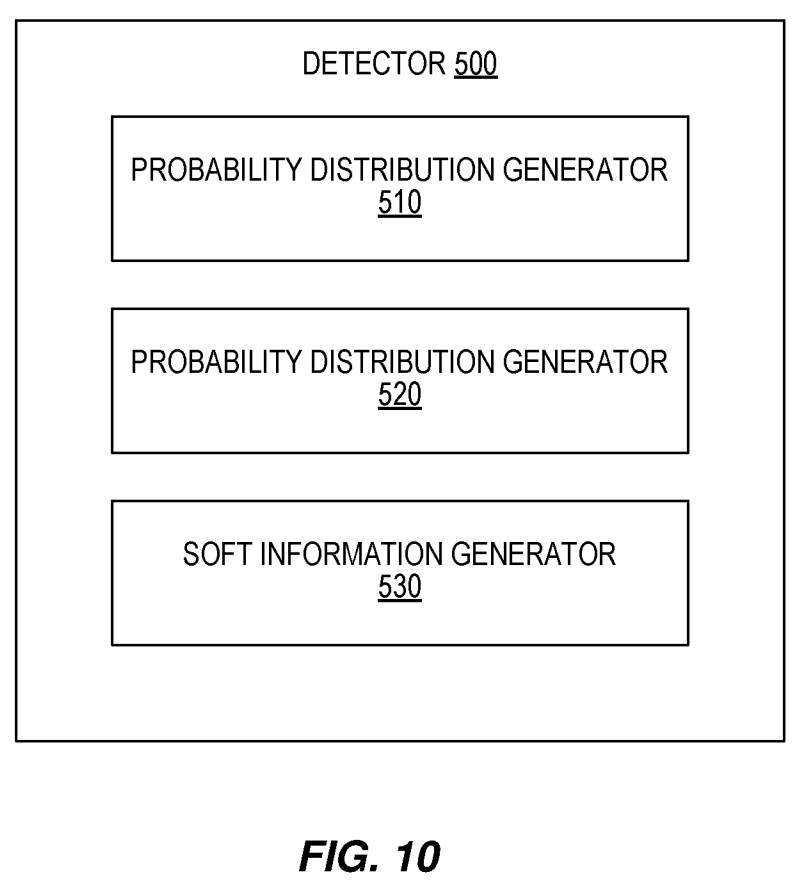

DETECTOR 500

PROBABILITY DISTRIBUTION GENERATOR 510

PROBABILITY DISTRIBUTION GENERATOR 520

SOFT INFORMATION GENERATOR 530

FIG. 10

QUANTUM APPROACH TO GENERATE SOFT BIT INFORMATION IN MULTI-ANTENNA COMMUNICATION SYSTEMS

The present disclosure relates generally to soft detection of received signals in a wireless communication system and, more particularly, to soft detection of a multiple input, multiple output (MIMO) signals.

BACKGROUND

MIMO is an advanced multi-antenna transmission and reception technique to improve the spectral efficiency of a wireless communication system and thereby boost the overall system capacity. MIMO systems employ multiple antennas at the transmitter and receiver to transmit and receive information. The receiver can exploit the spatial dimensions of the signal at the receiver to achieve higher spectral efficiency and higher data rates without increasing bandwidth.

While use of MIMO techniques can significantly increase the data carrying capacity of wireless systems, the complexity of the detector increases exponentially with the number of transmit antennas or/and the number of bits per constellation point. The optimal detector for MIMO is a maximum-likelihood (ML) or Maximum a posteriori Probability (MAP) detector, which performs an exhaustive search. However, the complexity of the ML or MAP detector grows exponentially with the number of transmit antennas and number of bits in a symbol. Therefore, it is not practical to implement a MIMO detector in scenarios having a large number of antennas and higher order modulation.

Several suboptimal detector structures have been proposed in literature for reducing the complexity of the MIMO detector. These can be classified into linear and nonlinear detectors. Linear detectors include zero-forcing (ZF) and minimum mean-square error (MMSE) detectors, and the nonlinear receivers include decision feedback, nulling-cancelling and variants relying on successive interference cancellation. These suboptimal detectors are easy to implement but their bit error rate (BER) or frame error rate (FER) performance is significantly inferior to that of the optimum MIMO detector.

Type A detectors are easy to implement (in terms of number of computations in each slot) but their performance (packet error rate, throughput etc.) is significantly inferior to that of the optimum MIMO detector (ML/MAP). The performance of Type B detectors is far superior to that of Type A detectors. However, their complexity increases exponentially with the number of transmit antennas or/and the number of bits per constellation point. Hence due to the complexity reasons Type B detectors are not possible to implement with classical computing methods.

Existing work aims to solve hard MIMO ML detection problem using quantum annealing and quantum approximate optimization techniques which gives optimal symbol s which minimizes the symbol error. Once this is done, the value of each bit is set. However soft values, showing how likely it is that a given bit in a symbol vector is a one or zero, are to be passed to the channel decoder to achieve near-capacity on multiple-antenna system.

SUMMARY

In the proposed solution, quantum computing are used to solve the soft MIMO detection problem. The soft MIMO detection problem is mapped to an Ising Spin Glass formulation, i.e., an Ising Hamiltonian. This Ising Hamiltonian may equivalently be represented as a Quantum Unconstrained Binary Optimization (QUBO). Quantum Approximate Optimization Algorithm (QAOA) is used to determine the ground state of the Ising Hamiltonian which corresponds to the estimate of the transmitted symbol vector. The use of the QAOA method yields a probability distribution of states from which the log-likelihood ratio of each bit can be extracted.

A first aspect of the disclosure comprise a method implemented by a soft-decision MIMO detector. The method comprises generating a probability distribution of states associated with different candidate symbol vectors given a received signal and channel matrix of the MIMO channel. The method further comprises obtaining a received signal estimate based on the probability distribution of states. The received signal estimate comprises a plurality of bit estimates. The method further comprises computing, for each of one or more bit estimates in the received signal estimate, soft bit information based on the probability distribution of states.

A second aspect of the disclosure comprises a soft-decision MIMO detector/receiver. The soft-decision MIMO detector is configured to generate a probability distribution of states associated with different candidate symbol vectors given a received signal and channel matrix of the MIMO channel. The soft-decision MIMO detector is further configured to obtain a received signal estimate based on the probability distribution of states. The received signal estimate comprises a plurality of bit estimates. The soft-decision MIMO detector is configured to compute, for each of one or more bit estimates in the received signal estimate, soft bit information based on the probability distribution of states.

A third aspect of the disclosure comprises a receiver configured to perform by a soft-decision MIMO detection. The receiver comprises communication circuitry configured to receive MIMO signals and processing circuitry configured to detect the received MIMO signal. The processing circuitry is configured to generate a probability distribution of states associated with different candidate symbol vectors given a received signal and channel matrix of the MIMO channel. The processing circuitry is further configured to obtain a received signal estimate based on the probability distribution of states. The received signal estimate comprises a plurality of bit estimates. The processing circuitry is further configured to compute, for each of one or more bit estimates in the received signal estimate, soft bit information based on the probability distribution of states.

A fourth aspect of the disclosure comprises a computer program comprising executable instructions that, when executed by a processing circuit in a detector/receiver, causes the detector/receiver to perform the method according to the first aspect.

An fifth aspect of the disclosure comprises a carrier containing a computer program according to the fourth aspect wherein the carrier is one of an electronic signal, optical signal, radio signal, or computer readable storage medium.

BRIEF DESCRIPTION OF THE DRAWINGS

FIG. 10 illustrates a soft-decision MIMO detector.

DETAILED DESCRIPTION

Figure 1:
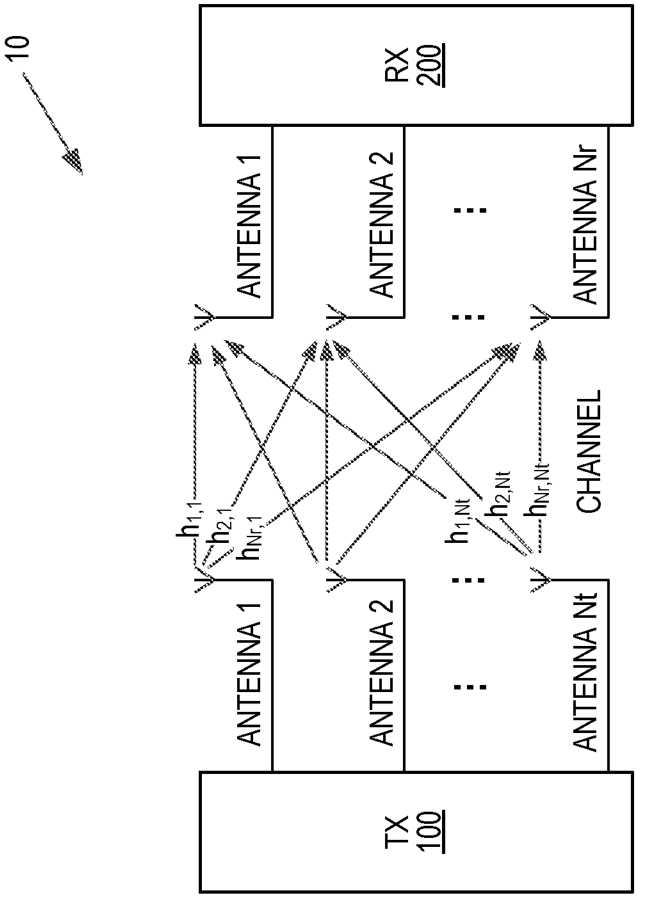
FIG. 1 illustrates a MIMO channel.

FIG. 1 illustrates a linear MIMO channel with $N_t$ transmit antennas at the input and $N_r$ receive antennas at the output. For the sake of simplicity, a single transmitter and receiver are assumed, but the linear MIMO channel also applies to systems with more than one transmitter and/or receiver. The transmitter simultaneously transmits $N_t$ symbols, $s_1$, $s_2, \ldots, s_{N_t}$ from a finite symbol constellation to a receiver with $N_r$ antennas over a linear MIMO channel. At the receiver, $N_r$ symbols, $y_1, y_2, \ldots, y_{N_r}$ are received, each comprising a linear combination of the $N_t$ input symbols plus additive noise.

Figure 2:
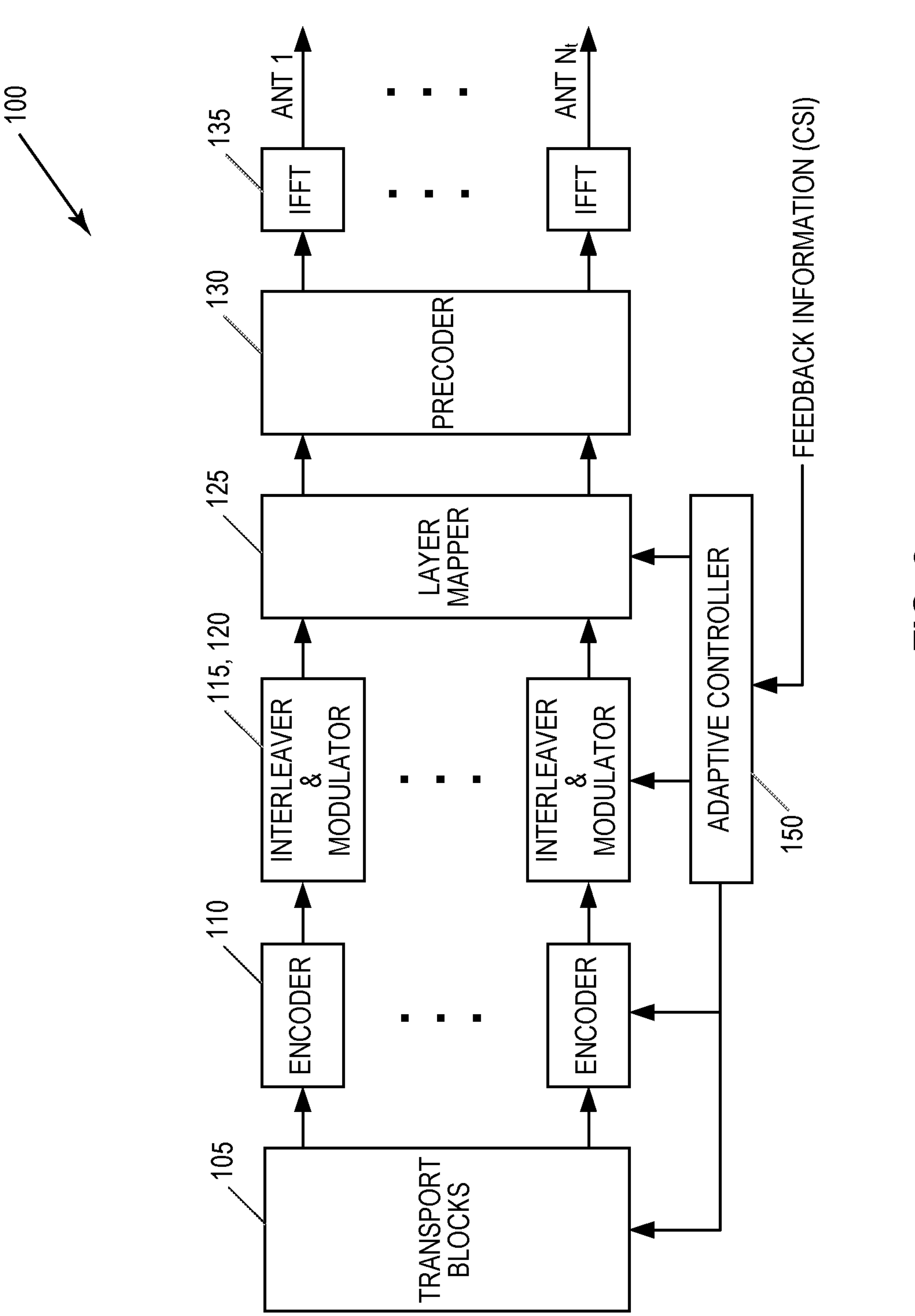
FIG. 2 illustrates a MIMO transmitter.

FIG. 2 illustrates a transmitter 100 in a MIMO communication system with $N_t$ transmit antennas. A transport block formatter 105 outputs $N_c$ transport blocks, where $N_c \leq N_t$. CRC bits are added to each transport block and passed to the channel encoder 110. The channel encoder 110 adds parity bits to protect the data. The resulting bitstream is passed through an interleaver 115, which interleaves the bits to increase robustness to burst errors. An adaptive controller 150 adaptively controls the interleaver size by puncturing to increase the data rate. The adaptation is done by using the information from the feedback channel, for example channel state information (CSI) sent by the receiver 200. The interleaved data is passed through a symbol mapper (modulator) 120 that maps the coded bits in the bitstream to corresponding modulation symbols depending on the modulation scheme. The symbol mapper 120 is also controlled by the adaptive controller 150. After modulation, the modulation symbols are passed through a layer mapper 125 and precoder 130. The resultant streams are then passed through Fast Fourier Transform (IFFT) 135. The IFFT is necessary for some communication systems that implements Orthogonal Frequency Division Multiple access (OFDMA) as the access technology, such as 5G, Long Term Evolution (LTE), and LTE-Advanced (LTE-A). In other systems, the IFFT block may not be required depending on the multiple access system. The encoded stream is then transmitted through the respective antenna.

Figure 3:
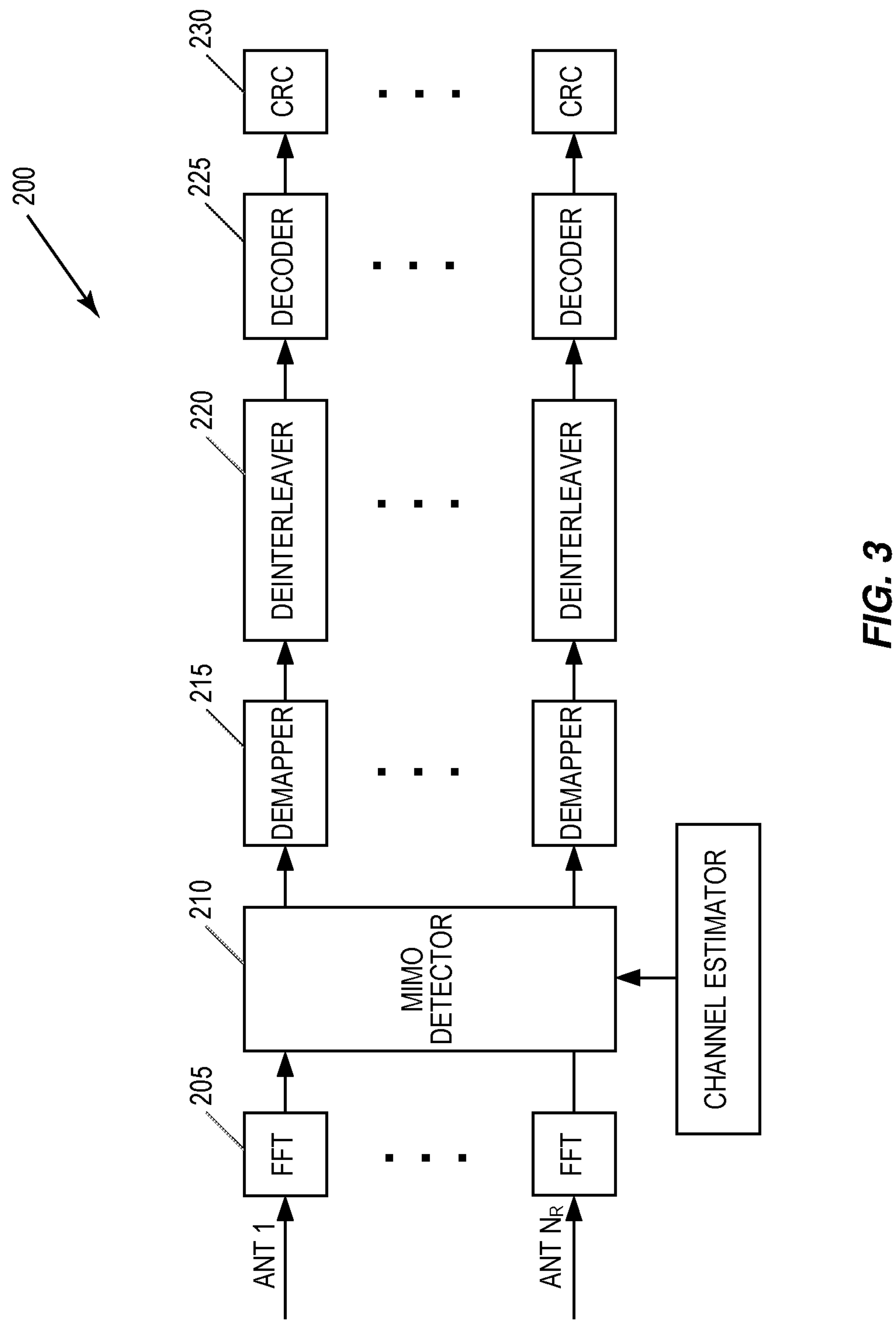
FIG. 3 illustrates a MIMO receiver.

FIG. 3 illustrates a receiver 200 in a MIMO communication system with $N_r$ receive antennas $N_r$. The received signal is converted to frequency domain by the Fast Fourier Transform (FFT) block 205. A MIMO detector 210 is used to reduce the multi antenna interference and detect the received signals. The de-mapper 215 computes the log-likelihood ratios for the bits in the received symbols output by the MIMO detector. The bit stream is then de-interleaved in a de-interleaver 220 and passed to the channel decoder 225. A CRC check 230 is performed on the output of the channel decoder 225. If the CRC is passed, the transport block is passed and an ACK is sent back to the transmitter 100 via a feedback channel. If the CRC fails, a NACK is sent back to the transmitter 100 using the feedback channel.

For soft MIMO detection using MAP algorithm, demapper 215 is integrated with MIMO detector as the soft MIMO gives the bit log-likelihood ratio. In the case of a MMSE-type detector, a separate demapper 215 that takes the MMSE output, which is in the symbol domain, to compute the bit loglikelihood ratio.

In the Multiple Input Multiple Output (MIMO) system, the received signal at the receiver can be modelled according to:

$$y = Hs + n \tag{1}$$

where $y \in \mathbb{C}^{N_r}$, $H \in \mathbb{C}^{N_r \otimes N_t}$, $s \in \mathbb{S}^{N_t}$ and $n \sim \mathcal{CN}(0, N_0)$. $N_0$ is the noise variance. The vector s belongs to subspace $\mathbb{S}^{N_t}$ which is the search space of possible symbol vectors s given the signal constellation. This space varies based on the number of transmit antennas $N_t$ and dependent on the choice of modulation scheme such as Binary Phase Shift Keying (BPSK), Quadrature Phase Shift Keying (QPSK), and 16 Quadrature Amplitude Modulation (QAM).

The challenge for the detector at the receiver 200 is how to estimate the input symbol vector s, given the received symbol vector y, and known channel matrix H. The channel matrix is given by:

$$H = \begin{bmatrix} h_{1,1} & h_{1,2} & \cdots & h_{1,N_r} \\ h_{2,1} & h_{2,2} & \cdots & h_{2,N_r} \\ \vdots & \vdots & \ddots & \vdots \\ h_{N_t1} & h_{N_t2} & \cdots & h_{N_t,N_r} \end{bmatrix} \tag{2}$$

The optimal detector for a linear MIMO channel is a maximum likelihood (ML) detector or maximum a posteriori (MAP) detector that conducts an exhaustive search of the subspace $\mathbb{S}^{N_t}$ for the symbol vector s that minimizes the symbol errors. In MIMO hard detection, the estimate $\hat{s}$ of the symbol vector that minimizes the symbol error is given by:

$$\hat{s} = \underset{s \in \mathbb{S}^{N_t}}{\operatorname{argmin}} \|y - Hs\|^2 \tag{3}$$

where the term $\|y-Hs\|^2$ is the measure of the error.

Once estimate $\hat{s}$ is obtained, the value of each bit in the transmitted symbol s is set and can be determined by mapping each symbol s in the symbol vector ŝ to the corresponding bits represented by the symbol. The received codeword comprising a sequence of received symbols s is then input to the decoder 225 at the receiver 200 to recover the original data that was sent from the transmitter 100 to the receiver 200.

There are two main types of detectors for MIMO: hard decision detectors which decide whether a bit is zero or one (referred to herein as a hard bit), and soft decision detectors which decide how likely it is that a bit is zero or one (referred to herein as a soft bit or soft value). The soft value is typically expressed as a log-likelihood ratio.

Equation (3) represents the hard MIMO maximum likelihood detection problem and its solution provides hard bit values for decoding. To achieve near-capacity on multiple-antenna system, it is preferable to provide soft values to the decoder.

One approach to soft MIMO maximum likelihood detection is described below. For simplicity, it is assumed that each symbol s in the symbol vector s is a binary value, e.g., 0 or 1. Based on this assumption, the symbol vector s is given by:

$$s = \begin{bmatrix} b_1 \\ \vdots \\ b_{N_t} \end{bmatrix} \tag{4}$$

The symbol vector s can be viewed as a bitstring. In soft-bit detection, each soft bit can be defined as the a posteriori log-likelihood ratio:

$$l(b_i \mid y) = \log\left[\frac{P(b_i = 1 \mid y)}{P(b_i = 0 \mid y)}\right] \tag{5}$$

where $P(b_i=1|y)$ is the probability that the received bit is a 1 given y, and $P(b_i=1|y)$ is the probability that the received bit is a 0 given y. Equation (5) can be interpreted as the log-likelihood ratio of the ith bit being equal to one or zero given y. Equation (5) can be expanded to obtain:

$$l(b_i \mid y) = \log\left[\frac{\sum_{b_i(s)=1} e^{-\frac{1}{N_0}\|y-Hs\|^2}}{\sum_{b_i(s)=0} e^{-\frac{1}{N_0}\|y-Hs\|^2}}\right] \tag{6}$$

The notation $\Sigma_{b_i(s)}=1$ denotes the sum over all possible vectors s in which the ith bit is equal to 1. It is noted that $b_i(s)=1$ and $b_i(s)=0$ are both subspaces of $\mathbb{S}^{N_t}$ It is also noted that the two subspaces are disjoint. For simplicity, the subspace $b_i(s)=0$ is denoted as $\mathbb{B}_0$ and $b_i(s)=1$ is denoted $\mathbb{B}_1$.

Using the max-log approximation, Equation (6) can be re-written as:

$$l(b_i \mid y) \approx \frac{1}{N_0}\left[\min_{s\in\mathbb{B}_0}\|y - Hs\|^2 - \min_{s\in\mathbb{B}_1}\|y - Hs\|^2\right] \tag{7}$$

Equation (7) includes two separate hard MIMO detection problems where two separate searches are performed for the two optimal symbol vectors in the disjoint subspaces $b_i(s)=1$ and $b_i(s)=0$. Each respective minimum $\|y-Hs\|^2$ can be computed once the optimal symbol vectors are found.

One difficulty with soft MIMO detection derives from the fact that for each bit $b_i$ in a symbol vector, two separate hard detection problems must be solved. The complexity of a hard MIMO maximum likelihood detector increases exponentially with the number of transmit/receive antennas and the number of bits in a symbol. Thus, for larger MIMO problems with many transmit antennas and/or higher order modulation schemes, such as 16- or 64-QAM, the soft MIMO maximum likelihood detection problem becomes exponentially difficult to determine. Due to the complexity, soft MIMO maximum likelihood detection is not practical with classical computing methods.

Existing work in the field aims to solve the hard MIMO maximum likelihood detection problem using quantum annealing and quantum approximate optimization techniques which give the optimal symbol vector s that minimizes the symbol error. Even with these relatively new quantum computing techniques, two separate minimizations need to be performed for each transmitted bit using the max-log approximation.

One aspect of the present disclosure is to use quantum computing methods to generate the soft bit information for decoding by solving a single hard MIMO maximum likelihood detection problem using the quantum computer. In embodiments of the present disclosure, the probabilities $P(b_1=1|y)$ and $P(b_i=0|y)$ are determined from the state distribution that is obtained when executing the circuit with a large number of shots. The techniques herein do not rely on the max-log approximation and enable the computation of the log-likelihood ratios for each bit in a symbol ($l(b_i|y)$) by solving a single minimization problem for each symbol. These techniques enable the detection of symbols transmitted with a higher number of transmit antennas and large constellation sizes with low complexity quantum computing methods. Using these techniques, it is possible to solve the hard MIMO detection problem a single time for a given symbol and use the probability distribution of states to determine the soft MIMO log-likelihood ratios of the bits in the symbol. computation of the soft information can be performed faster because it is not required to solve two separate minimization problems for each bit's log-likelihood ratio.

The quantum techniques herein described can be implemented using both Ising and Quadratic Unconstrained Binary Optimization (QUBO) QUBO models.

The Ising model describes a physical system of discrete spin variables where each variable can take upon one of two values, −1 or 1, i.e a two-level system. The configuration space of possible values has dimension $2^N$ where N denotes the number of spin variables. We can denote this configuration space as:

$$\Omega = \{-1, +1\}^N \tag{8}$$

The Ising spin glass model is given by the Hamiltonian of a given spin configurations $s\in\Omega$.

$$H(s) = \frac{1}{2}\sum_{i,j=1}^{N} g_{ij}s_is_j + \sum_{i=1}^{N} f_is_i \tag{9}$$

where $g_{ij}$ denotes the coupling strength of the interactions between spin i and j, and $f_i$ is the coupling strength of the interaction of spin i with the external (magnetic) field. In general, one attempts to solve the Ising model to determine some spin configuration s which minimizes the Hamiltonian.

The QUBO model is equivalent to the Ising model with a different formulation. The QUBO model can be written as $$q = [q_1, \ldots, q_{N_t}]^T = \operatorname{argmin} \frac{1}{2} \sum_{i,j=1}^{N} Q_{ij} q_i q_j \tag{10}$$

In this case $q_i$ are binary decision variables $q_i \in \{0,1\}$ and $Q_{ij}$ is a symmetric matrix of coefficients. The main difference between this and the Ising model is that the decision variables are zero or one, whereas for the Ising model the decision variables are −1 or 1. One can easily convert a QUBO model to an Ising model by substituting the decision variables with $$q_i = \frac{s_i + 1}{2}.$$

To solve the MIMO detection problem using quantum computing, the hard MIMO detection problem is mapped from a binary integer linear formulation to a quantum formulation that matches the Ising or QUBO model. Since both models are equivalent, the choice of model is not important. Each of the bits in a symbol ($b_i \in s$) can be represented with a qubit since each bit can take on one of two values. When more complex modulation schemes, such as QPSK, are used, more qubits are required. A simple example is the 2×2 QPSK MIMO case. In this case, the symbols s in the vector s are complex, meaning that each entry in the symbol vector s can encode two bits. One such symbol vector is:

$$s = \begin{bmatrix} 1+j \\ -1+j \end{bmatrix} \tag{11}$$

which corresponds to the bitstring 0010. The QUBO coefficients of each problem can be determined depending on the choice of modulation scheme. Generally, a linear transformation for the expansion of the norm in the hard MIMO detection problem will still yield a quadratic polynomial objective function. These transformations can take advantage of the helpful QUBO property of binary variables where $$q_i = q_i^2.$$

In the following paragraphs, the transformations are described for different modulation schemes in order to convert a MIMO detection problem into QUBO form.

In the case of BPSK, each entry of a symbol vector s consists of a single bit which can be either −1 or 1, i.e that $b_i \in \{-1, +1\}$. In this case we can map each bit in a symbol to a single binary QUBO variable using the transformation $$s_i \rightarrow 2q_i - 1 \tag{12}$$

In the case of QPSK, each entry of a symbol vector s consists of two bits, meaning that the entry has four possible states. When using QPSK, each symbol is represented as a complex number $$s_i = s_i^I + js_i^Q,$$

and the possible states for the symbol are $s_i \in \{\pm 1 \pm j\}$, meaning that the real part can take on values $$s_i^I \in \{-1, +1\}$$

and the complex part can take on $$s_i^Q \in \{-1, +1\}.$$

The QPSK symbol can be visualized as a two-dimensional BPSK model where the real and complex parts each represent one bit each. In our QUBO model we represent each part as one qubit each. In order to map the QPSK symbol to a QUBO formulation, the following transformation can be used:

$$s_i \rightarrow (2q_{2i-1} - 1) + j(2q_{2i} - 1) \tag{13}$$

As QPSK is a generalization of BPSK, 16-QAM is a generalization of QPSK, where 4 bits per $s_i$ are transmitted instead of 2. In this case $$s_i^I, s_i^Q \in \{\pm 1, \pm 3\},$$

meaning that an example of a symbol is $s_i = -1+3j$. Since the real and imaginary parts can each take on four values, two qubits are required to represent each part. In total, 4 qubits are required to represent one $s_i$. We can use the following mapping to QUBO:

$$s_i \rightarrow (4q_{4i-3} + 2q_{4i-2} - 3) + j(4q_{4i-1} + 2q_{4i} - 3) \tag{14}$$

Using the principles described above, the mapping can be extended to any QAM constellation.

Given some received symbol vector y and channel matrix H, the mappings described above can be used to create a QUBO/Ising problem depending on the modulation scheme. The term $s_i$ in the symbol error $\|y-Hs\|^2$ is replaced with the given mapping. After expanding and identifying terms, an upper triangular $Q_{ij}$ is obtained. The QUBO problem can be solved using a quantum computer.

The QUBO formulation is easily converted to an Ising formulation. Once the Ising formulation is obtained, it can be mapped a quantum circuit. In the Ising formulation, the spins of the Hamiltonian $s_i$ can take on the values $s_i \in \{-1, +1\}$, and these values can be mapped to the eigenvalues of the Pauli Z matrix given by $$Z = \begin{bmatrix} 1 & 0 \\ 0 & -1 \end{bmatrix} \tag{15}$$

This matrix has eigenvalues 1 and −1 with the eigenvectors being the computational basis states.

$$Z|0\rangle = \begin{bmatrix} 1 & 0 \\ 0 & -1 \end{bmatrix}\begin{bmatrix} 1 \\ 0 \end{bmatrix} = \begin{bmatrix} 1 \\ 0 \end{bmatrix} = |0\rangle \tag{16}$$

$$Z|1\rangle = \begin{bmatrix} 1 & 0 \\ 0 & -1 \end{bmatrix}\begin{bmatrix} 0 \\ 1 \end{bmatrix} = -\begin{bmatrix} 0 \\ 1 \end{bmatrix} = (-1)|1\rangle \tag{17}$$

The eigenvalue 1 has eigenvector $|0\rangle$ and eigenvalue −1 has eigenvector $|1\rangle$. The $s_i$ terms in the Hamiltonian can be replace with corresponding Pauli Z operators. The resulting Hamiltonian takes the form:

$$H_f = \sum_{i<j}^{N} g_{ij} Z_i Z_j + \sum_{i=1}^{N} f_i Z_i \tag{18}$$

Based on the Hamiltonian given in Equation (18), the trial ansatz takes the form:

$$e^{-i\beta B} e^{-i\gamma H_f} H^{\otimes n}|0\rangle \tag{19}$$

where β and γ are parameters which will be tuned using QAOA. B is the mixer Hamiltonian $B=\Sigma_i X_i$ where $X_i$ are the Pauli X operators. The $Z_i$ and $X_i$ terms in the Hamiltonian can be mapped to single qubit gates. Starting with the $Z_i$ terms in the Hamiltonian, it is noted that the Z-rotation gate is given by $$R_z(\theta) = e^{-i\frac{\theta}{2}Z}.$$

Given the replacement $\theta \rightarrow 2\gamma f_i$, it can be seen that for each $Z_i$ in the cost Hamiltonian can be represented using a Z rotation gate where the angle of rotation is given by the parameter γ and the Ising coefficient $f_i$. A similar argument can be made for the Pauli X operators.

The $Z_i Z_j$ terms can further be implemented by a $$e^{-i\frac{\theta}{2}Z_i \otimes Z_j}$$

term, which is a parametric rotational ZZ-gate given in IBM's quantum SDK as an RZZ gate. In this case the replacement $\theta \rightarrow 2\gamma g_{ij}$ is used. For each $Z_i Z_j$ term, there is an RZZ gate using qubit i as the control and qubit j as the target, where the angle of rotation is given by the parameter γ and the Ising coefficient (coupling coefficient) $g_{ij}$.

As an illustration, consider a simple 2×2 QPSK example. In this example, there are two antennas at the transmitter 100 and two antennas at the receiver 200. Each symbol is complex and represents two bits. Thus, the received symbol vector s represents four bits. The problem for the detector 225 is to find the two transmitted symbols each comprising two bits; $s_0=[b_0, b_1]$ and $s_1=[b_2, b_3]$.

Assume a symbol vector $$s = \begin{bmatrix} 1+j \\ -1+j \end{bmatrix},$$

channel matrix $$H = \begin{bmatrix} 1 & 0.5 \\ 0.6 & 1 \end{bmatrix},$$

and a complex noise vector with variance $N_0$. The received symbol $$y = \begin{bmatrix} 0.89-1.41j \\ -0.18-1.1j \end{bmatrix}.$$

The goal is to determine the LLRs of each bit such that we can predict the values of the symbol vector s given y and H.

Because the example uses QPSK modulation, the detection problem is transformed into the QUBO formulation and then to the Ising formulation. The resulting coupling matrix and vectors are:

$$g_{ij} = \begin{bmatrix} 0 & 0 & 2.2 & 0 \\ 0 & 0 & 0 & 2.2 \\ 0 & 0 & 0 & 0 \\ 0 & 0 & 0 & 0 \end{bmatrix} \tag{20}$$

$$f_i = \begin{bmatrix} -1.57 \\ 4.13 \\ -0.53 \\ 3.61 \end{bmatrix} \tag{21}$$

Figure 4:
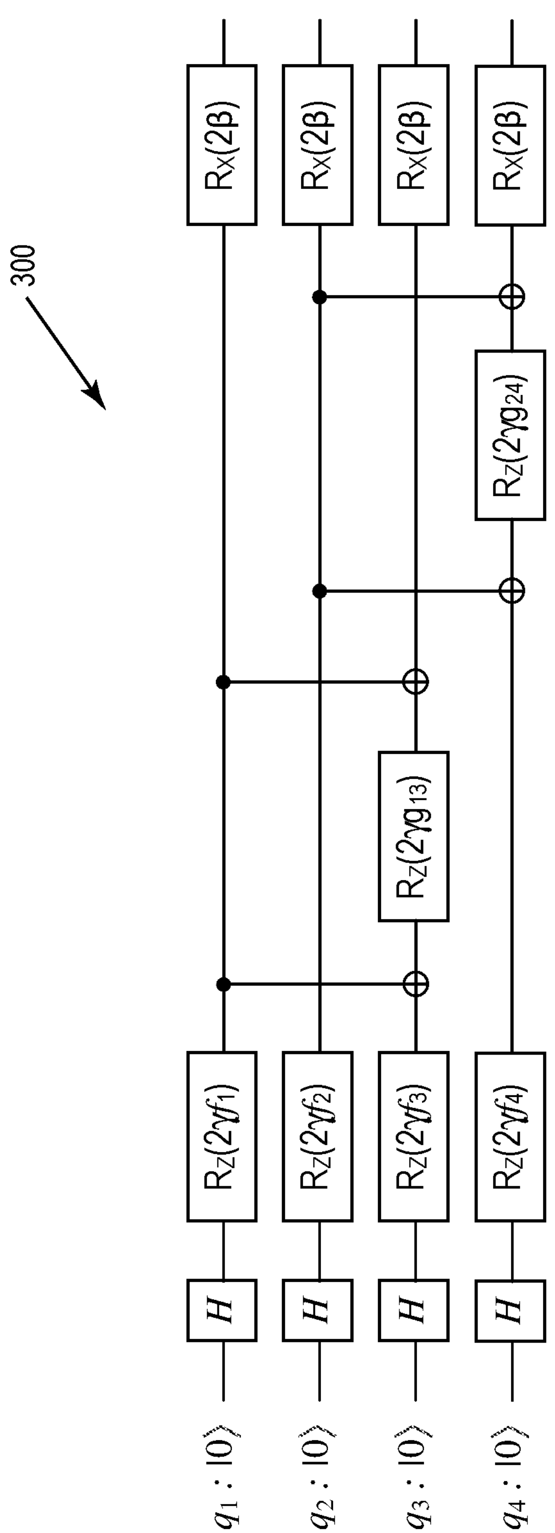
FIG. 4 illustrates an exemplary trial ansatz circuit for soft-decision MIMO detection.

The corresponding QAOA circuit is shown in FIG. 4.

Figure 5:
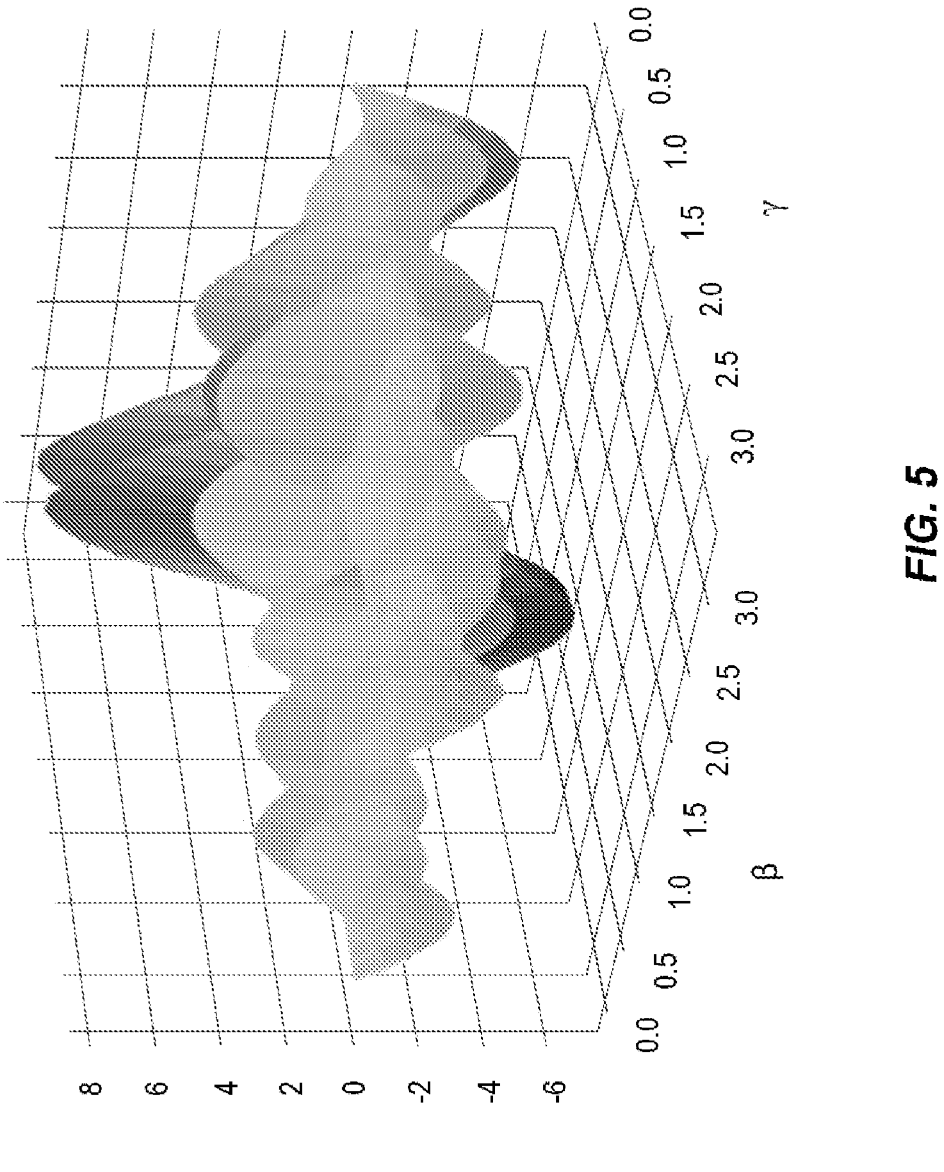
FIG. 5 illustrates a cost landscape of the exemplary Hamiltonian plotted against the variational parameters.

A global optimizer, such as Differential Evolution optimizer, can be used to determine the optimal parameters $\gamma_{opt}$, $\beta_{opt}$, that minimize the expectation value of the Hamiltonian. In this example, the cost landscape is shown in FIG. 5.

Once the optimal parameters are determined, the ansatz circuit is executed using the optimal parameters with many shots to obtain a probability distribution of the states. One can interpret the most probable state in the probability distribution as being the original symbol vector s. The probability distribution of states is then used to calculate the log-likelihood ratio of each bit based on Equation (5).

Figure 6:
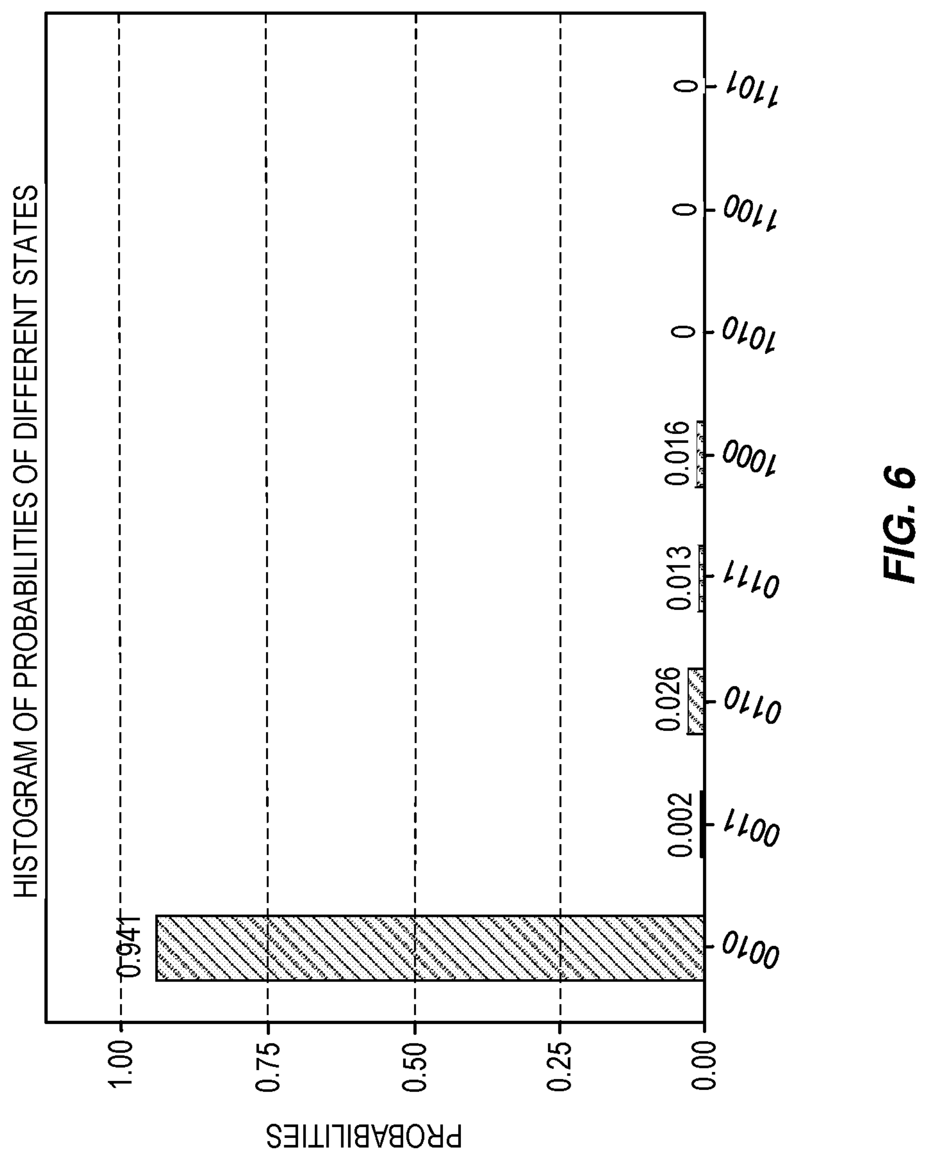
FIG. 6 is an example of a histogram of probabilities of different states.

FIG. 6 shows the histogram of probabilities for different states. As mentioned earlier, because the binary decision variables are mapped to the eigenvalues of the Pauli Z operator, the state $|0\rangle$ is interpreted as a bit b=1 and the state $|1\rangle$ is interpreted as bit b=−1. It can be seen from the histogram that the most likely state is the state $|0010\rangle$ which corresponds to $s=[1+j, -1+j]^T$, which is the correct symbol classification. This is the hard decision for the symbol vector.

To obtain the soft information, the probability distribution of states is used in order to determine $P(b_i=0|y)$ and $P(b_i=1|y)$. The process is classically efficient. The probability $P(b_0=0|y)$ is determined by summing the probabilities in the distribution of states where $b_0=0$. In this case we have:

$$P(b_0=0 \mid y) = 0.941 + 0.002 + 0.026 + 0.013 = 0.982 \tag{22}$$

The same process is repeated for $P(b_0=1|y)$ and all bits. Alternatively, $P(b_0=1|y)$ can be computed as $1-P(b_i=0|y)$. Table 1 below gives the probability sums for each bit and the log-likelihood ratio.

TABLE 1 probability sums and log-likelihood ratios for bits

| | $P(b_i = 0\|y)$ | $P(b_i = 1\|y)$ | $l(b_i\|y)$ |
|---|---|---|---|
| $b_0$ | 0.982 | 0.018 | −3.99 |
| $b_1$ | 0.959 | 0.041 | −3.15 |
| $b_2$ | 0.016 | 0.984 | 4.11 |
| $b_3$ | 0.984 | 0.016 | −4.11 |

In this example, the correct predictions of the Log-likelihood ratios are obtained.

Figure 7:
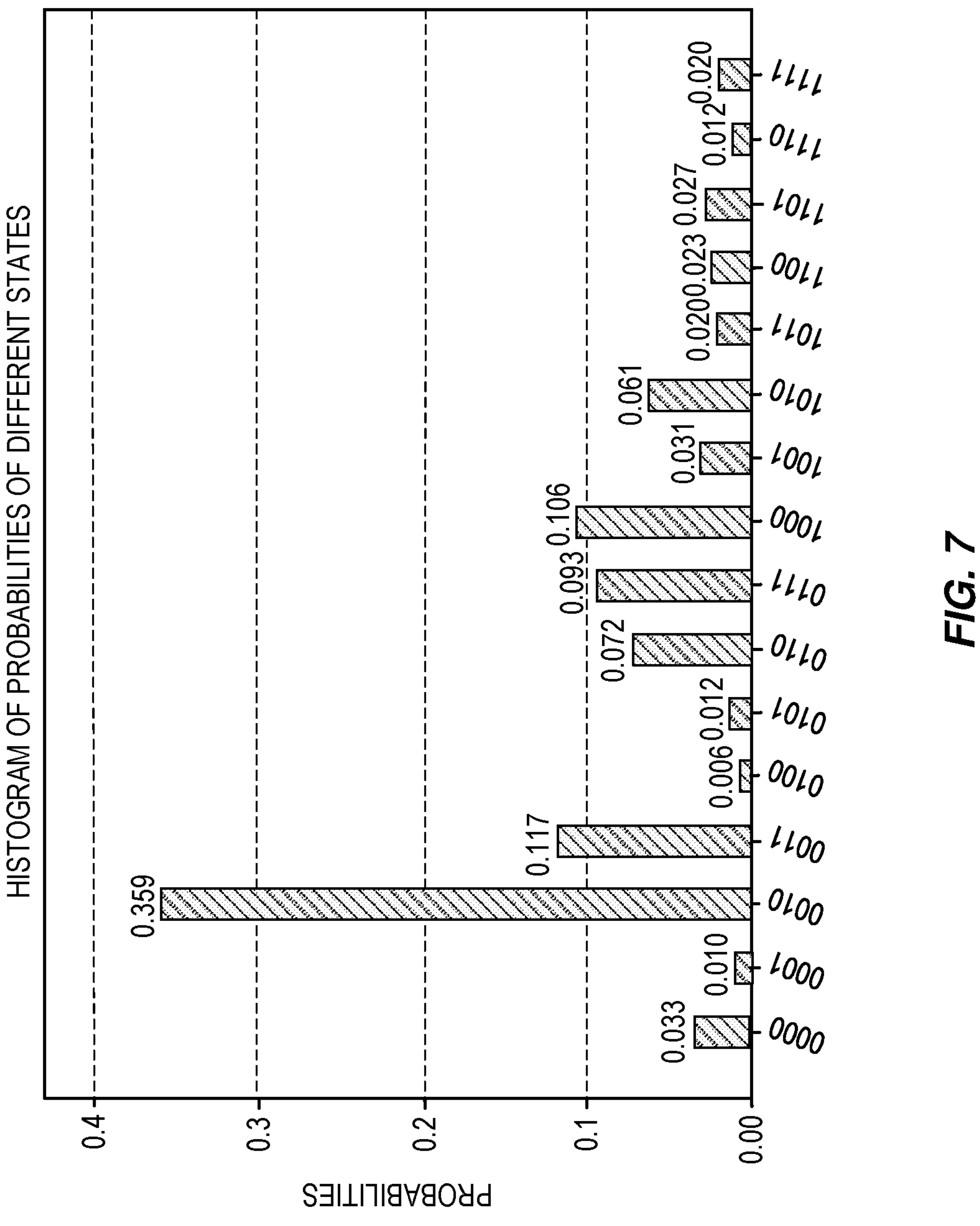
FIG. 7 is another example of a histogram of probabilities of different states.

FIG. 7 shows the histogram of the same circuit with the same optimal parameters $\beta_{opt}$, $\gamma_{opt}$ executed on IBM's 7 qubit quantum computer "ibm_lagos". It can be seen that the correct state is still the most probable state, however with a lower probability. Table 2 shows the probabilities associated with each bit and the log-likelihood ratios calculated based on the histogram in FIG. 7.

TABLE 2 probability sums and log-likelihood ratios for bits

| | $P(b_i = 0\|y)$ | $P(b_i = 1\|y)$ | $l(b_i\|y)$ |
|---|---|---|---|
| $b_0$ | 0.702 | 0.298 | −0.85 |
| $b_1$ | 0.735 | 0.265 | −1.02 |
| $b_2$ | 0.248 | 0.752 | 1.10 |
| $b_3$ | 0.672 | 0.328 | −0.71 |

Figure 8:
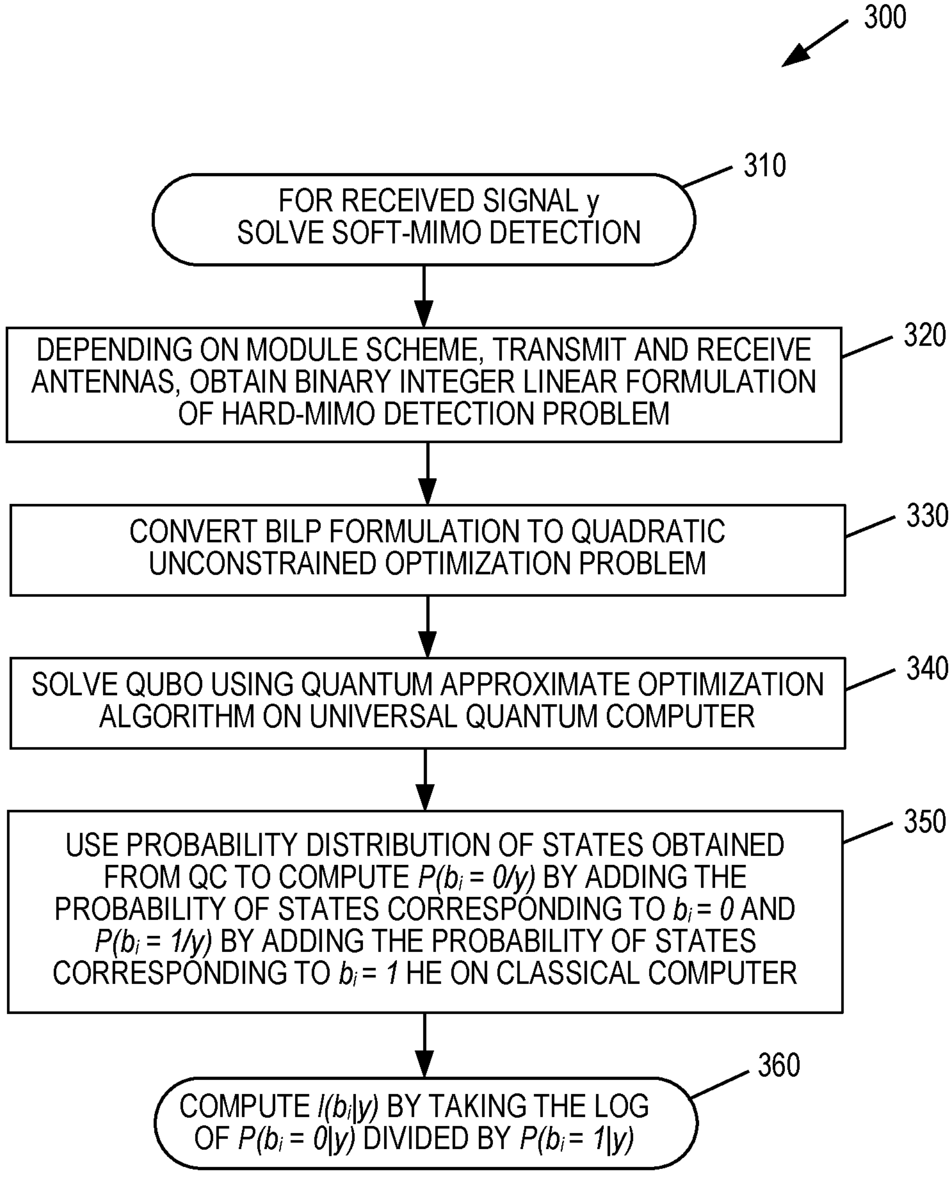
FIG. 8 is a method implemented by a MIMO receiver.

FIG. 8 illustrates an exemplary method of soft MIMO detection using the quantum methods as herein described. A receiver receives a signal y over a MIMO channel (block 310). Depending on the modulation scheme and antenna configuration at the transmitter and receiver, the receiver determines a binary integer linear formulation of the hard-MIMO detection problem (block 320) and converts the binary integer linear formulation to a QUBO formulation (block 330). The QUBO problem is solved by applying the QAOA method on a quantum computer (block 340). The solution of the QUBO problem yields a probability distribution of states derived by the quantum computer. For each bit $b_i$, the probability distribution of states is used to determine $P(b_i=0|y)$ and $P(b_i=1|y)$ (block 350) $P(b_i=0|y)$ is determined by adding the probabilities of states corresponding to $b_i=0$ and $P(b_i=1|y)$ is determined by adding the probabilities of states corresponding to $b_i=1$. Alternatively, $P(b_0=1|y)$ can be computed as $1-P(b_i=0|y)$. The determination of the probabilities $P(b_i=0|y)$ and $P(b_i=1|y)$ can be performed on a classic computer. Once the probabilities $P(b_1=0|y)$ and $P(b_i=1|y)$ are known, the log-likelihood ratios for each bit is determined using Equation (5) by taking the log of $P(b_i=0|y)$ divided by $P(b_i=1|y)$ (block 360).

Figure 9:
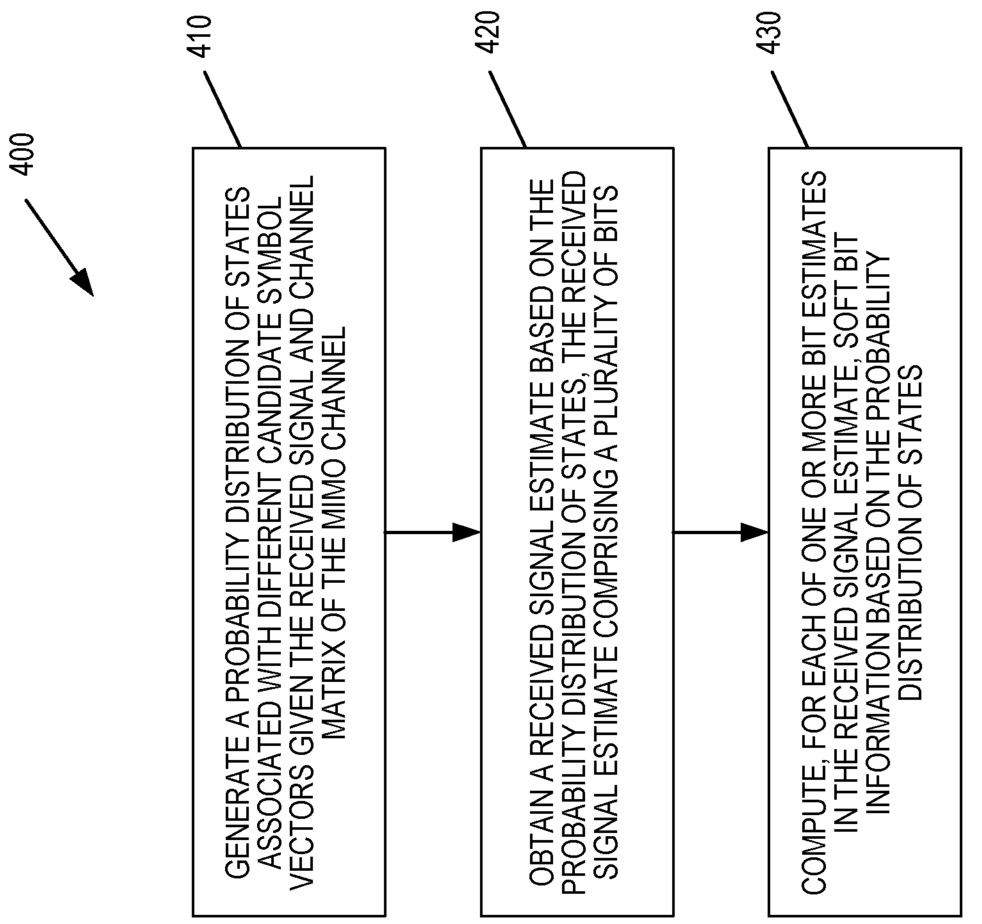
FIG. 9 illustrates a method implemented by a soft-decision MIMO detector.

FIG. 9 illustrates a more method of soft-MIMO detection performed by a MIMO detector at a receiver. The detector generates a probability distribution of states associated with different candidate symbol vectors given a received signal y and channel matrix H of the MIMO channel (block 410). The detector obtains a received signal estimate based on the probability distribution of states (block 420). The received signal estimate comprises a plurality of bit estimates. The detector computes, for each of one or more bit estimates in the received signal estimate, soft bit information based on the probability distribution of states (block 430).

In some embodiments of the method 400, generating the probability distribution of states associated with different candidate symbol vectors given the received signal comprises obtaining binary linear formulation of a hard detection metric, converting the binary linear formulation of the hard detection metric into a quantum unconstrained binary optimization (QUBO) formulation, and optimizing the quantum formulation of the hard detection metric using a quantum computer to generate the probability distribution of the states.

In some embodiments of the method 400, converting the binary linear formulation of the hard detection metric into the QUBO formulation comprises mapping each bit of a transmitted symbol vector to a spin variable of an Ising spin glass model.

In some embodiments of the method 400, optimizing the quantum formulation of the hard detection metric comprises optimizing the QUBO metric with the quantum computer using a Quantum Approximate Optimization Algorithm (QAOA).

In some embodiments of the method 400, optimizing the QUBO metric with the quantum computer using QAOA comprises generating an ansatz circuit for the Ising spin glass model, and iteratively executing the trail ansatz circuit using the quantum computer to generate the probability distribution of states.

In some embodiments of the method 400, determining a received signal estimate based on the probability distribution of states, the receives signal estimate comprising a plurality of bits comprises finding the state with the highest probability given the received signal and channel matrix of the MIMO channel.

In some embodiments of the method 400, computing, soft bit information for a bit estimate in the received signal estimate comprises computing a log-likelihood ratio for the bit estimate.

In some embodiments of the method 400, computing, soft bit information for a bit in the received signal estimate comprises computing a first sum of probabilities of states in the probability distribution of states where the corresponding bit estimate has a first value, computing a second sum of probabilities of states in the probability distribution of states where the corresponding bit estimate has a second value, and computing the log-likelihood ratio from the first and second sums.

In some embodiments of the method 400, computing the log-likelihood ratio from the first and second sums comprises computing the log likelihood ratio as the log of the first sum divided by the second sum.

Some embodiments of the method 400 further comprise decoding the received signal estimate using the soft bit information to obtain a decoded signal.

FIG. 10 illustrates the main functional components of a soft-decision MIMO detector configured to provide soft bit information for decoding. The soft-decision MIMO detector 500 comprises a probability distribution generator 510, a received signal estimator 520, and a soft bit generator 530. The various functional components of the detector 500 may be implemented by hardware and/or by software code that is executed by one or more processors or processing circuits. The components may be embodied in proprietary hardware, or implemented in a virtual machine or container. The probability distribution generator 510 is configured to generate a probability distribution of states associated with different candidate symbol vectors given the received signal and channel matrix of the MIMO channel. The received signal estimator 520 is configured to obtain a received signal estimate based on the probability distribution of states, the received signal estimate comprising a plurality of bits. The soft bit generator 530 is configured to compute, for each of one or more bit estimates in the received signal estimate, soft bit information based on the probability distribution of states.

Figure 11:
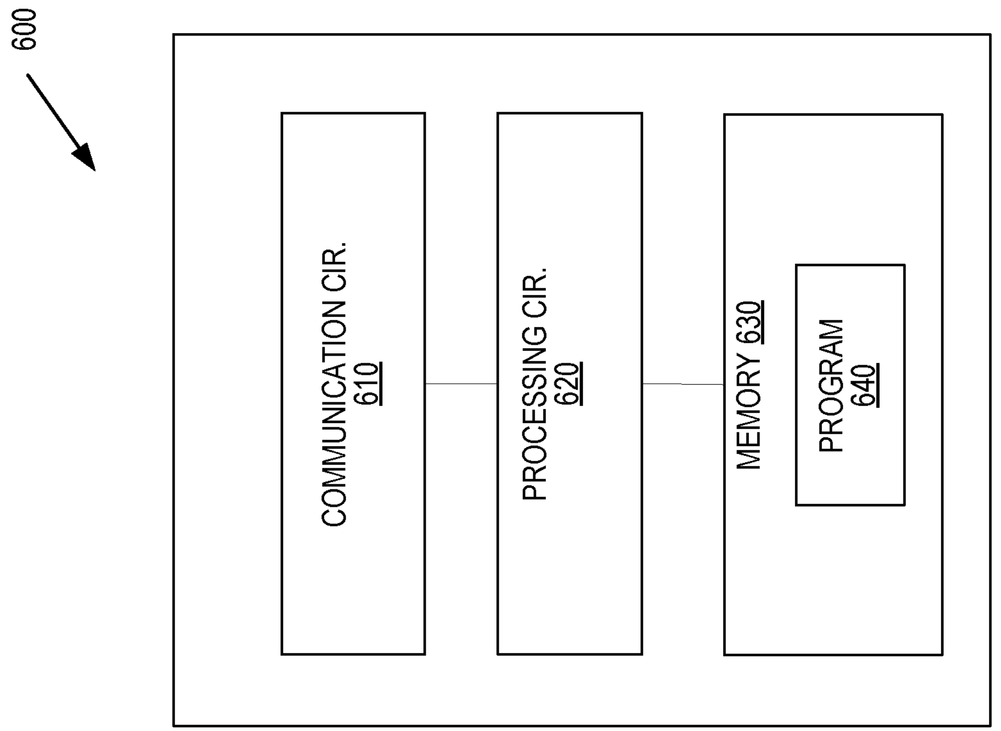
FIG. 11 illustrates a MIMO receiver configured to implement soft-decision MIMO detection.

FIG. 11 illustrates a receiver 600 configured to perform soft-decision MIMO detection as herein described. The receiver comprises communication circuitry 620, a processing circuitry 630, and memory 640.

The communication circuitry 620 includes connects to one or more antennas 510 shown) and comprises the radio frequency (RF) circuitry for transmitting and receiving signals over a wireless communication channel. The communication circuitry 620 may, for example, comprise a transmitter and receiver configured to operate according to the 5G/NR standard.

The processing circuitry 630 controls the overall operation of the receiver 600 and processes the signals transmitted to or received by the receiver 600. The processing circuitry 630 is configured to perform soft-decision MIMO detection as herein described. The processing circuitry 630 may comprise one or more microprocessors, microcontrollers, central processing unit (CPUs), digital signal processors, application specific integrated circuits (ASICs), field programmable gate arrays (FPGA), hardware, firmware, or a combination thereof. In one exemplary embodiment, the processing circuitry is configured generate a probability distribution of states associated with different candidate symbol vectors given a received signal y and channel matrix H of the MIMO channel and obtain a received signal estimate based on the probability distribution of states. The received signal estimate comprises a plurality of bit estimates. The processing circuit is further configured to compute, for each of one or more bit estimates in the received signal estimate, soft bit information based on the probability distribution of states.

Memory 640 comprises both volatile and non-volatile memory for storing computer program code and data needed by the processing circuitry 630 for operation. Memory 640 may comprise any tangible, non-transitory computer-readable storage medium for storing data including electronic, magnetic, optical, electromagnetic, or semiconductor data storage. Memory 640 stores a computer program 650 comprising executable instructions that configure the processing circuitry 630 to implement the methods and processes as herein described including the methods 300, 400 shown in FIGS. 8 and 9, respectively. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 650 for configuring the processing circuitry 630 as herein described may be stored in a removable memory, such as a portable compact disc, portable digital video disc, or other removable media. The computer program 650 may also be embodied in a carrier such as an electronic signal, optical signal, radio signal, or computer readable storage medium.

Those skilled in the art will also appreciate that embodiments herein further include corresponding computer programs. A computer program comprises instructions that, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 12:
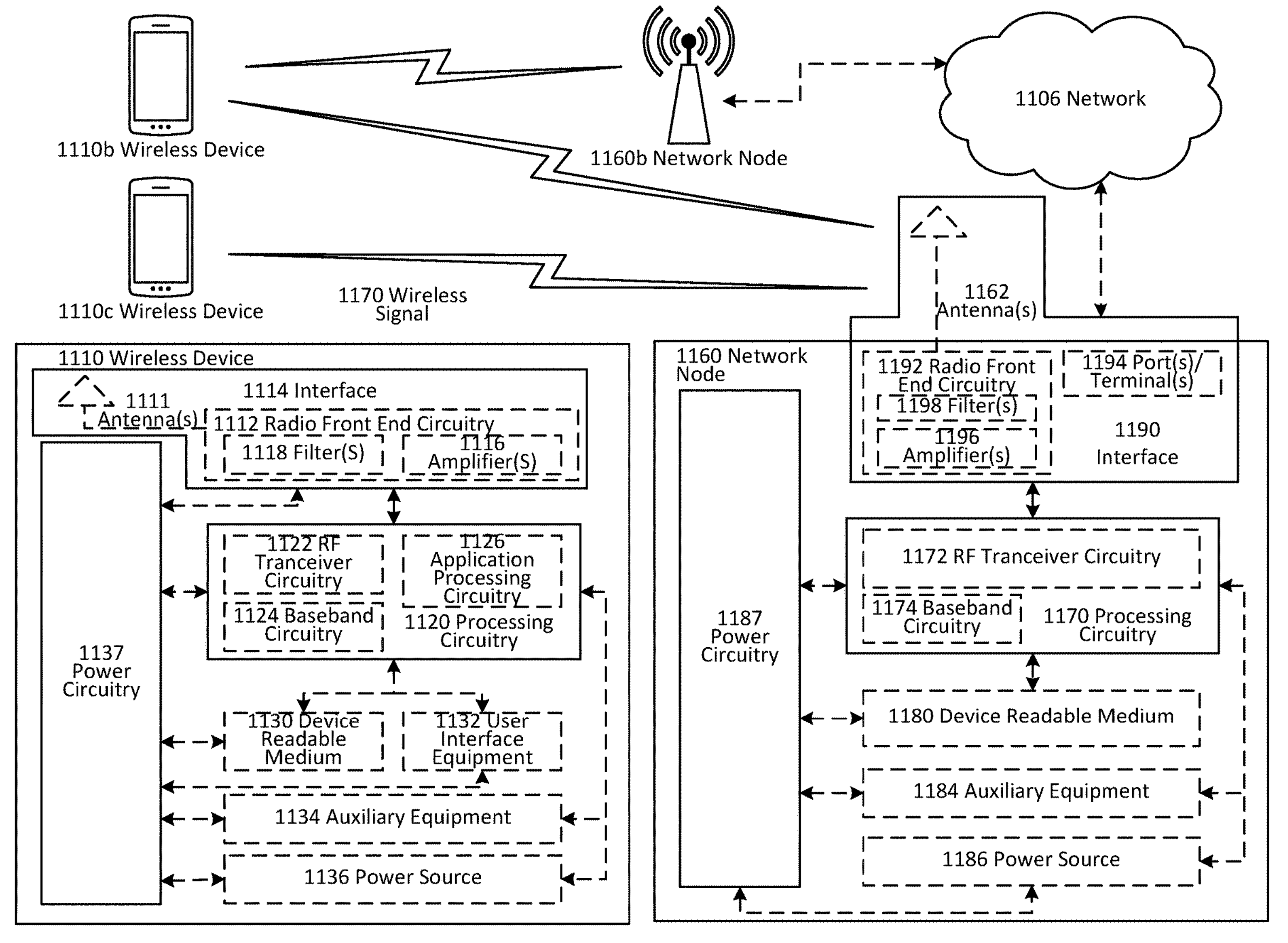
FIG. 12 is a schematic block diagram illustrating an example wireless network, according to particular embodiments of the present disclosure.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components.

In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry

1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 12 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 13:
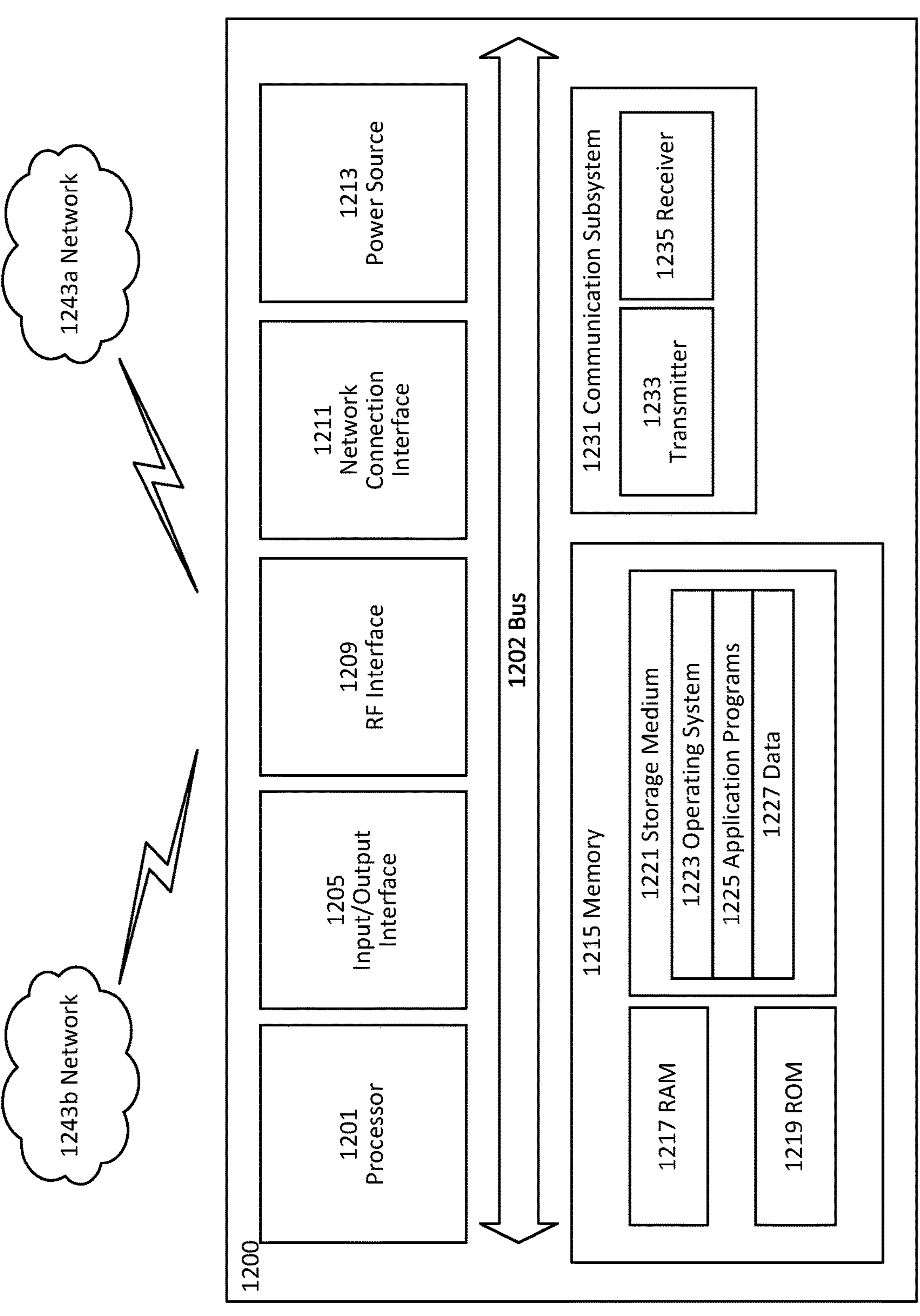
FIG. 13 is a schematic block diagram illustrating an example of a user equipment, according to particular embodiments of the present disclosure.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 13, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 14:
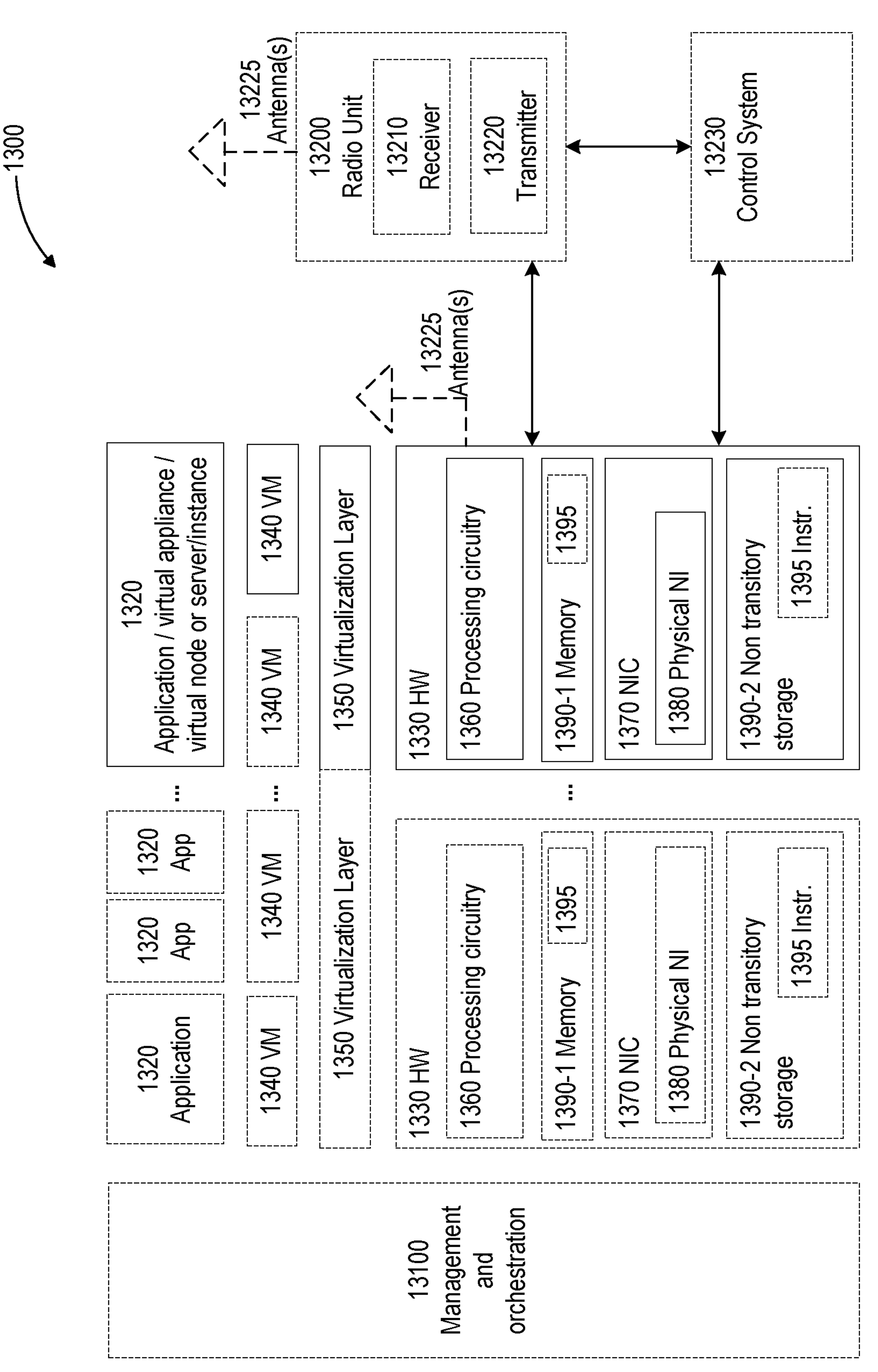
FIG. 14 is a schematic block diagram illustrating an example of a virtualization environment, according to particular embodiments of the present disclosure.

FIG. 14 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 14, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 14.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 15:
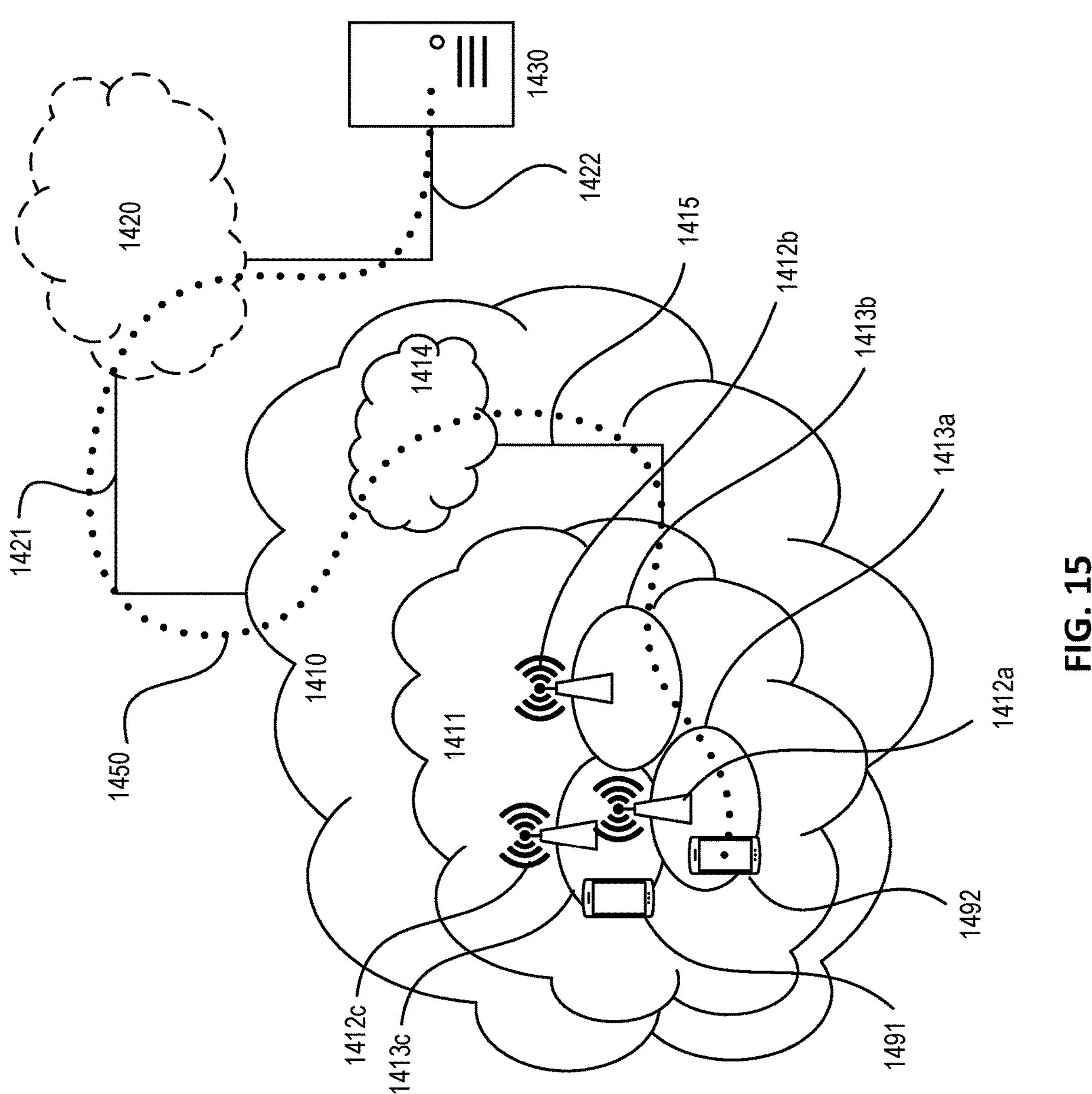
FIG. 15 is a schematic illustrating an example telecommunication network, according to particular embodiments of the present disclosure.

FIG. 15 illustrates a telecommunication network connected via an intermediate network to a host computer in accordance with some embodiments. In particular, with reference to FIG. 15, in accordance with an embodiment, a communication system includes telecommunication network 1410, such as a 3GPP-type cellular network, which comprises access network 1411, such as a radio access network, and core network 1414. Access network 1411 comprises a plurality of base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 15 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 16:
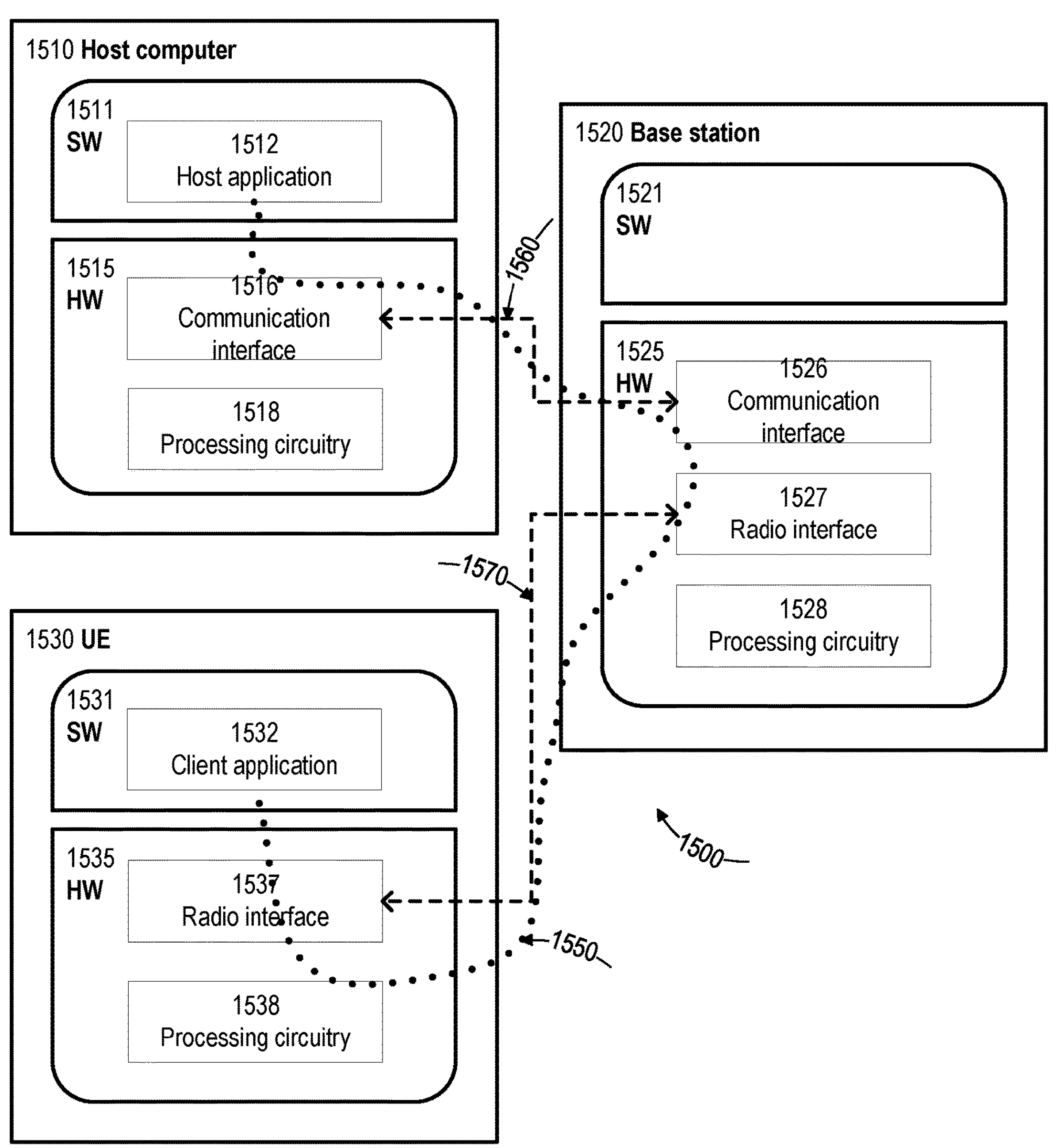
FIG. 16 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 16) served by base station 1520. Communication interface 1526 may be configured to facilitate connection 1560 to host computer 1510. Connection 1560 may be direct or it may pass through a core network (not shown in FIG. 16) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 16 may be similar or identical to host computer 1430, one of base stations 1412*a*, 1412*b*, 1412*c* and one of UEs 1491, 1492 of FIG. 15, respectively. This is to say, the inner workings of these entities may be as shown in FIG. 16 and independently, the surrounding network topology may be that of FIG. 15.

In FIG. 16, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the NAS security and latency and thereby provide benefits such as improved user experience and robustness of user communications.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 17:
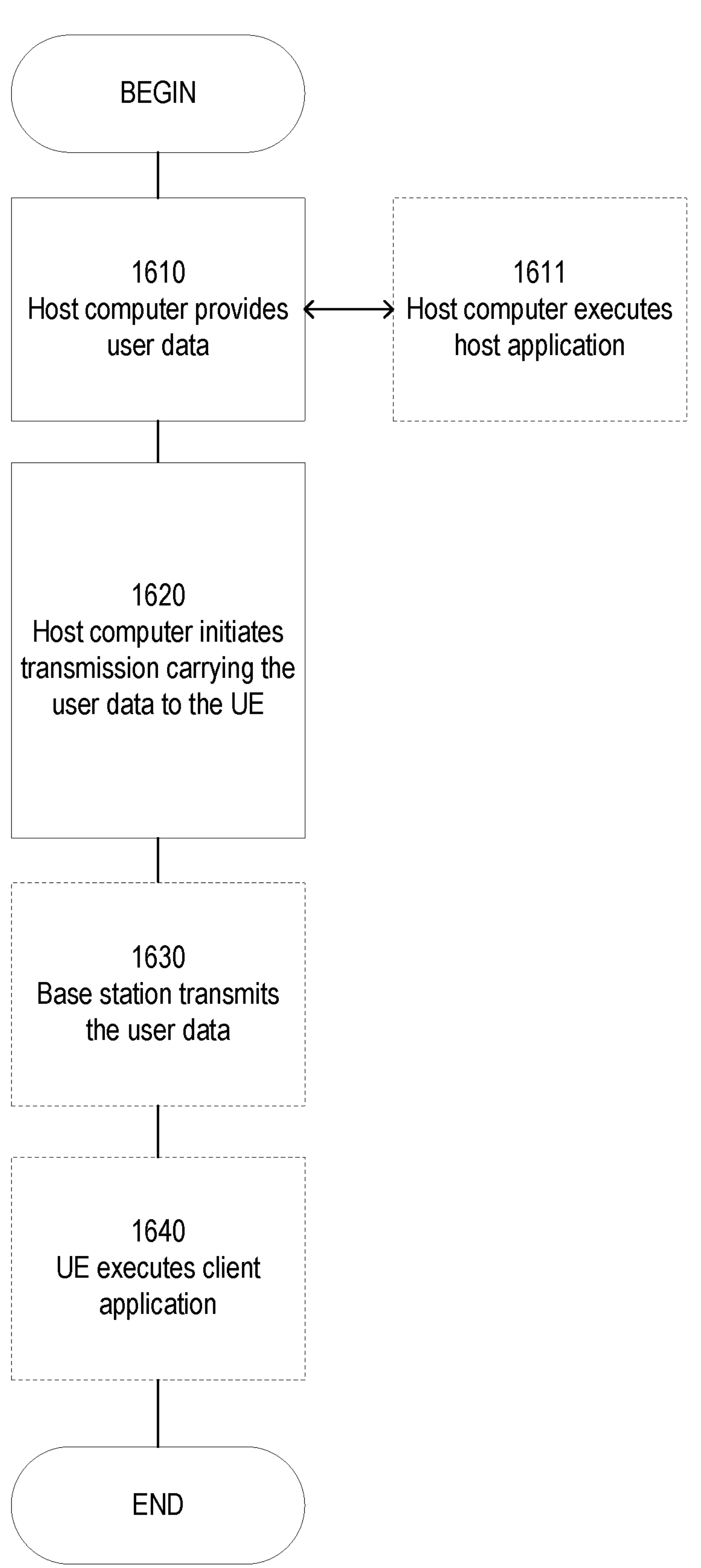
FIGS. 17-20 are flow diagrams, each of which illustrates an example method implemented in a communication system, according to particular embodiments of the present disclosure.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 18:
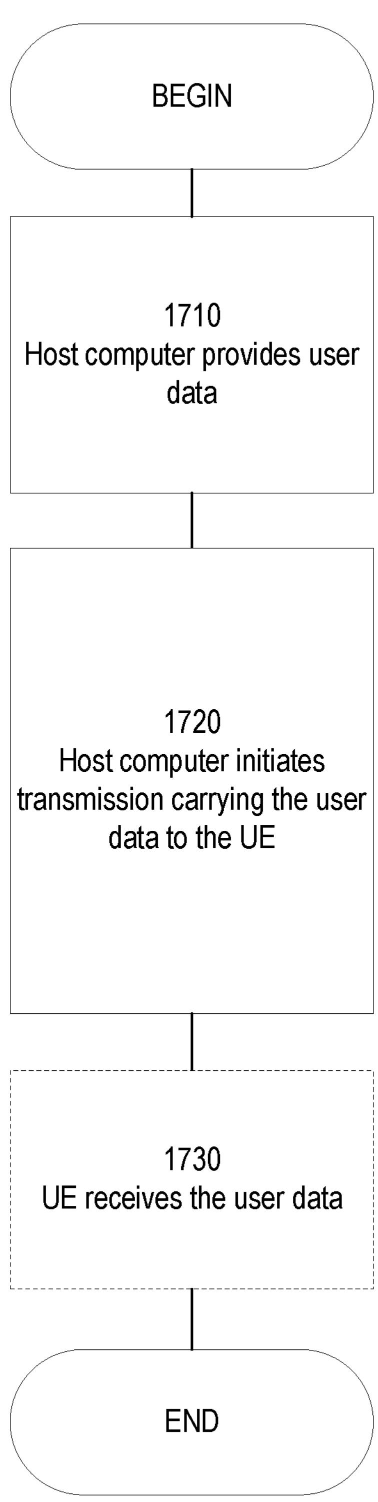

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 19:
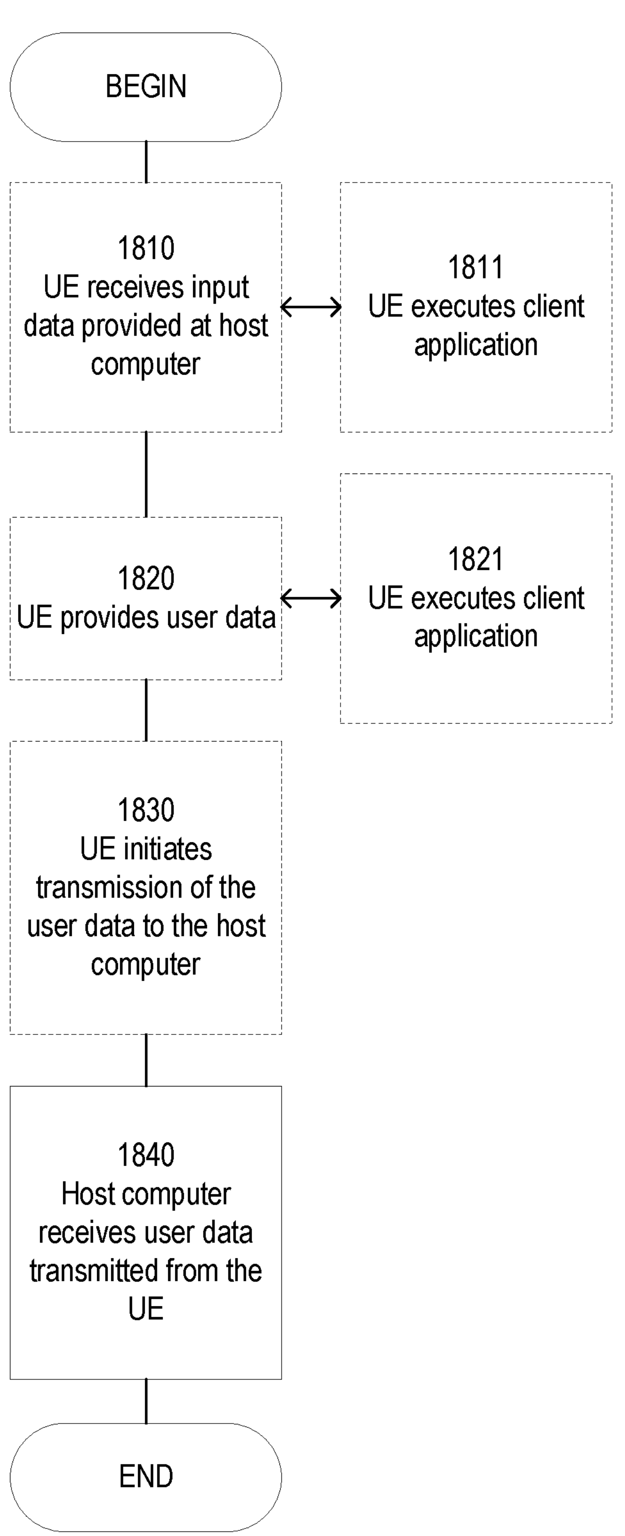

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 20:
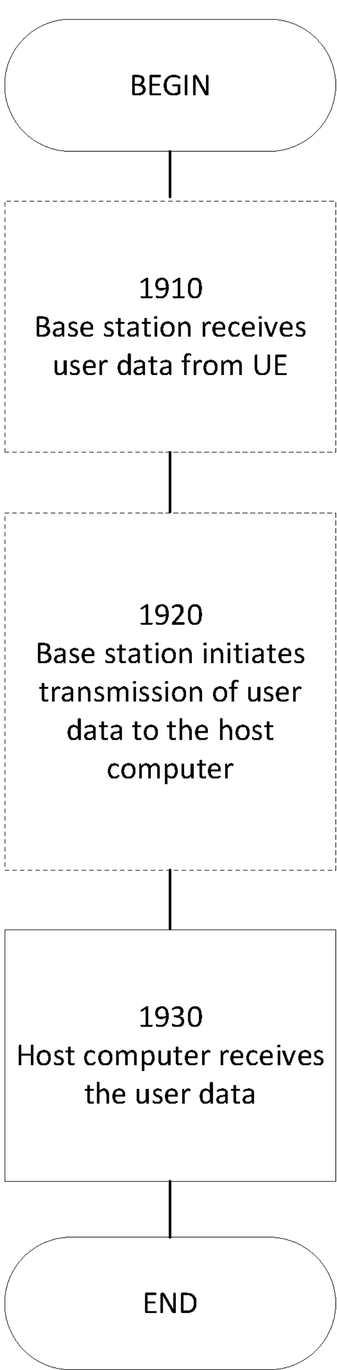

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method for a receiver configured to detect a signal received via a multiple input, multiple output (MIMO) channel, the method comprising generating a probability distribution of states associated with different candidate symbol vectors, based on the received signal and a channel matrix of the MIMO channel, wherein generating the probability distribution of states comprises:

obtaining binary linear formulation of a hard detection metric;

converting the binary linear formulation of the hard detection metric into a quantum unconstrained binary optimization (QUBO) formulation; and optimizing the quantum formulation of the hard detection metric using a quantum computer to generate the probability distribution of the states;

obtaining a received signal estimate based on the probability distribution of states, wherein the received signal estimate comprises a plurality of bit estimates; and for each of one or more of the bit estimates in the received signal estimate, computing soft bit information based on the probability distribution of states.

2. The method of claim 1, wherein converting the binary linear formulation of the hard detection metric into the QUBO formulation comprises mapping each bit of a transmitted symbol vector to a spin variable of an Ising spin glass model.

3. The method of claim 2, wherein optimizing the quantum formulation of the hard detection metric comprises optimizing the QUBO metric using a Quantum Approximate Optimization Algorithm (QAOA) performed by the quantum computer.

4. The method of claim 3, wherein optimizing the QUBO metric using the QAOA performed by the quantum computer comprises:

generating an ansatz circuit for the Ising spin glass model; and iteratively executing the ansatz circuit using the quantum computer to generate the probability distribution of states.

5. The method of claim 1, wherein determining a received signal estimate based on the probability distribution of states comprises finding the state with the highest probability given the received signal and channel matrix of the MIMO channel.

6. The method of claim 1, wherein the soft bit information computed for each of the one or more bit estimates comprises a log-likelihood ratio.

7. The method of claim 6, wherein for each of the one or more bit estimates, computing the log-likelihood ratio comprises:

computing a first sum of probabilities of states, in the probability distribution of states, in which the corresponding bit estimate has a first value;

computing a second sum of probabilities of states, in the probability distribution of states, in which the corresponding bit estimate has a second value; and computing the log-likelihood ratio based on a logarithm of a ratio of the first sum to the second sum.

8. The method of claim 1, further comprising decoding the received signal estimate using the soft bit information to obtain a decoded signal.

9. A receiver configured to detect a signal received via a multiple input, multiple output (MIMO) channel, the receiver comprising communication circuitry and processing circuitry that are operably coupled and are configured to:

generate a probability distribution of states associated with different candidate symbol vectors, based on the received signal, a channel matrix of the MIMO channel, and the following operations:

obtaining binary linear formulation of a hard detection metric;

converting the binary linear formulation of the hard detection metric into a quantum unconstrained binary optimization (QUBO) formulation; and optimizing the quantum formulation of the hard detection metric using a quantum computer of the processing circuitry, to generate the probability distribution of the states;

obtain a received signal estimate based on the probability distribution of states, wherein the received signal estimate comprises a plurality of bit estimates; and for each of one or more of the bit estimates in the received signal estimate, compute soft bit information based on the probability distribution of states.

10. The receiver of claim 9, wherein the processing circuitry is configured to convert the binary linear formulation of the hard detection metric into the QUBO formulation based on mapping each bit of a transmitted symbol vector to a spin variable of an Ising spin glass model.

11. The receiver of claim 10, wherein the processing circuitry is configured to optimize the quantum formulation of the hard detection metric based on optimizing the QUBO metric using a Quantum Approximate Optimization Algorithm (QAOA) performed by the quantum computer.

12. The receiver of claim 11, wherein the processing circuitry is configured to optimize the QUBO metric using the QAOA performed by the quantum computer based on:

generating an ansatz circuit for the Ising spin glass model; and iteratively executing the ansatz circuit using the quantum computer to generate the probability distribution of states.

13. The receiver of claim 9, wherein the processing circuitry is configured to determine a received signal estimate based on the probability distribution of states, based on finding the state with the highest probability given the received signal and channel matrix of the MIMO channel.

14. The receiver of claim 9, wherein the soft bit information computed for each of the one or more bit estimates comprises a log-likelihood ratio.

15. The receiver of claim 14, wherein for each of the one or more bit estimates, the processing circuitry is configured to compute the log-likelihood ratio based on:

computing a first sum of probabilities of states, in the probability distribution of states, in which the corresponding bit estimate has a first value;

computing a second sum of probabilities of states, in the probability distribution of states, in which the corresponding bit estimate has a second value; and computing the log-likelihood ratio based on a logarithm of a ratio of the first sum to the second sum.

16. The receiver of claim 9, wherein the processing circuitry is configured to decode the received signal estimate using the soft bit information to obtain a decoded signal.

17. A non-transitory, computer-readable medium storing computer executable instructions that, when executed by processing circuitry, cause the method of claim 1 to be performed by the receiver configured to detect the signal received via the MIMO channel.

* * * * *